US008635185B2

(12) United States Patent
Somogyi et al.

(10) Patent No.: US 8,635,185 B2
(45) Date of Patent: Jan. 21, 2014

(54) SYSTEM AND METHOD FOR PROVIDING SESSION AFFINITY IN A CLUSTERED DATABASE ENVIRONMENT

(75) Inventors: Alexander Somogyi, Basking Ridge, NJ (US); Naresh Revanuru, Fremont, CA (US); Stephen Felts, Denville, NJ (US); Tong Zhou, Merrick, NY (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/398,538

(22) Filed: Feb. 16, 2012

(65) Prior Publication Data

US 2013/0054516 A1    Feb. 28, 2013

Related U.S. Application Data

(60) Provisional application No. 61/501,583, filed on Jun. 27, 2011.

(51) Int. Cl.
*G06F 17/00* (2006.01)

(52) U.S. Cl.
USPC ............................. 707/613; 707/694; 707/627

(58) Field of Classification Search
USPC ......................................................... 707/609
See application file for complete search history.

(56) References Cited

U.S. PATENT DOCUMENTS

| | | | |
|---|---|---|---|
| 5,109,384 A | | 4/1992 | Tseung |
| 6,424,992 B2 * | | 7/2002 | Devarakonda et al. ....... 709/203 |
| 7,376,953 B2 | | 5/2008 | Togasaki |
| 7,483,374 B2 | | 1/2009 | Nilakantan et al. |
| 7,991,904 B2 | | 8/2011 | Melnyk et al. |
| 8,131,860 B1 | | 3/2012 | Wong et al. |
| 8,260,757 B1 * | | 9/2012 | Chatterjee et al. ............ 707/703 |
| 2002/0174136 A1 | | 11/2002 | Cameron et al. |
| 2003/0078958 A1 | | 4/2003 | Pace |
| 2003/0120822 A1 | | 6/2003 | Langrind et al. |
| 2004/0177126 A1 | | 9/2004 | Maine |
| 2005/0038801 A1 | | 2/2005 | Colrain et al. |
| 2005/0094577 A1 | | 5/2005 | Ashwood-Smith |
| 2005/0262215 A1 | | 11/2005 | Kirov et al. |
| 2006/0031846 A1 | | 2/2006 | Jacobs et al. |
| 2006/0129676 A1 * | | 6/2006 | Modi et al. .................... 709/227 |
| 2006/0294417 A1 | | 12/2006 | Awashi et al. |

(Continued)

OTHER PUBLICATIONS

PCT International Search Report dated Dec. 6, 2011 in connection with PCT/US2011/051697, 11 pages.

(Continued)

*Primary Examiner* — Sherief Badawi
*Assistant Examiner* — Courtney Harmon
(74) *Attorney, Agent, or Firm* — Fliesler Meyer LLP

(57) ABSTRACT

A clustered database environment (e.g. Oracle Real Application Cluster (RAC)) includes multiple database instances that appear as one server. An application server (e.g. WebLogic Server (WLS)) can use a data source (e.g. an Oracle GridLink data source) and connection pools to connect with the clustered database. In accordance with an embodiment, a data source configuration allows for specification of a preferred affinity policy, such as a data affinity, temporal affinity, and/or session or session-based affinity policy. In accordance with an embodiment, the system includes a number of features that improve application connectivity in the clustered database environment, including a select-only case for application continuity, wherein an application-independent infrastructure, e.g. implemented within a Java Database Connectivity (JDBC) driver, enables recovery of work from an application perspective and masks system communications, hardware failures and hangs.

20 Claims, 8 Drawing Sheets

(56) References Cited

U.S. PATENT DOCUMENTS

| | | |
|---|---|---|
| 2007/0198684 A1 | 8/2007 | Mizushima |
| 2007/0203944 A1 | 8/2007 | Batra |
| 2008/0286741 A1 | 11/2008 | Call |
| 2009/0034537 A1* | 2/2009 | Colrain et al. ................ 370/400 |
| 2009/0037367 A1* | 2/2009 | Wein ................................ 707/2 |
| 2009/0150647 A1 | 6/2009 | Mejdrich et al. |
| 2010/0198920 A1 | 8/2010 | Wong et al. |
| 2010/0199259 A1 | 8/2010 | Quinn et al. |
| 2011/0071981 A1 | 3/2011 | Ghosh et al. |
| 2011/0228668 A1 | 9/2011 | Pillai et al. |

OTHER PUBLICATIONS

PCT International Search Report dated Dec. 6, 2011 in connection with PCT/US2011/051459, 9 pages.

* cited by examiner

SYSTEM AND METHOD FOR PROVIDING SESSION AFFINITY IN A CLUSTERED DATABASE ENVIRONMENT

CLAIM OF PRIORITY

This application claims the benefit of priority to U.S. Provisional Patent Application No. 61/501,583, titled "SYSTEM AND METHOD FOR PROVIDING IMPROVEMENTS IN USING A DATA SOURCE WITH AN APPLICATION SERVER AND CLUSTERED DATABASE", filed Jun. 27, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to computer systems and software, such as databases, middleware, and clustered data sources, and is particularly related to various improvements in using a data source with an application server and a clustered database.

RELATED APPLICATIONS

This application is related to U.S. patent application Ser. No. 13/234,027, titled "SYSTEM INCLUDING A MIDDLEWARE MACHINE ENVIRONMENT", filed Sep. 15, 2011, which claims the benefit of priority to U.S. Provisional Patent Application No. 61/383,285, titled "MIDDLEWARE MACHINE PLATFORM", filed Sep. 15, 2010, and U.S. Provisional Patent Application No. 61/384,227, titled "MIDDLEWARE MACHINE PLATFORM", filed Sep. 17, 2010; and U.S. patent application Ser. No. 13/168,506, titled "SYSTEM AND METHOD FOR USING A GRIDLINK DATA SOURCE TO CONNECT AN APPLICATION SERVER WITH A CLUSTERED DATABASE", filed Jun. 24, 2011, each of which applications are herein incorporated by reference.

BACKGROUND

Products such as Oracle Real Application Cluster (RAC) can be used to implement a clustered database environment, which in turn provides scalability and high availability to end-user applications. Clustered databases can also be integrated with other products, such as WebLogic Server (WLS), to provide an application server/clustered database environment. These are the general areas that embodiments of the invention are intended to address.

SUMMARY

The invention is generally related to computer systems and software, such as middleware and clustered data sources, and is particularly related to various improvements in using a data source with an application server and clustered database.

A clustered database environment (e.g. Oracle Real Application Cluster (RAC)) includes multiple database instances that appear as one server. An application server (e.g. WebLogic Server (WLS)) can use a data source (e.g. Oracle Grid Link data source) and connection pools to connect with the clustered database. A notification service broadcasts notifications describing state changes in the database instances, which are then used by the data source and connection pools to control access to the database instances.

In accordance with an embodiment, a data source configuration allows for specification of a preferred affinity policy, such as a data affinity, temporal affinity, and/or session or session-based affinity policy. A session affinity policy is used to provide database instance affinity for database access made under the context of a web session, i.e. session affinity is a form of temporal affinity whereby database operations are directed to a particular instance for a period of time when the application may be performing multiple, related updates to a specific data set. Directing such operations to a single database instance can be used to improve application performance due to increased local cache utilization.

In accordance with an embodiment, the system includes a number of features that improve application connectivity in the clustered database environment, including a select-only case for application continuity, wherein an application-independent infrastructure, e.g. implemented within a Java Database Connectivity (JDBC) driver, enables recovery of work from an application perspective and masks system communications, hardware failures and hangs.

DETAILED DESCRIPTION

In accordance with an embodiment, a clustered database environment (sometimes referred to as a database cluster) comprises one or more interconnected computers or servers, which together appear to end-users and end-user applications as if they are a single server. Unlike a single-instance database, which generally provides a one-to-one relationship between a database storage and a database instance, a clustered database can provide a one-to-many relationship between a database storage and several database instances.

For example, an Oracle Real Application Cluster (RAC) database system enables clustering of Oracle databases, using Oracle Clusterware infrastructure to bind multiple servers together, so that the servers can operate as a single system. The RAC database system can include many database instances, each of which can access a single database storage. In this manner, the combined processing power of such multiple servers can provide greater throughput and scalability than that achievable using a single server.

In accordance with an embodiment, a data source (which in several examples described herein is referred to a GridLink data source, although other forms of data source may be used) can be used to connect an application server, such as a WebLogic Server (WLS) instance, with a clustered database. A notification service can be used by the clustered database to broadcast notifications (such as the Fast Application Notification or "FAN" notifications or events used within the Oracle RAC product) that describe any state changes within the plurality of its database instances. The data source includes a connection pool, which manages a set of connections to the plurality of database instances in the clustered database. The data source can register with the notification service to receive notifications regarding the change of the clustered database. The application server can then adaptively configure and/or manage connections to the clustered database, according to any state changes of the clustered database at runtime.

Figure 1:
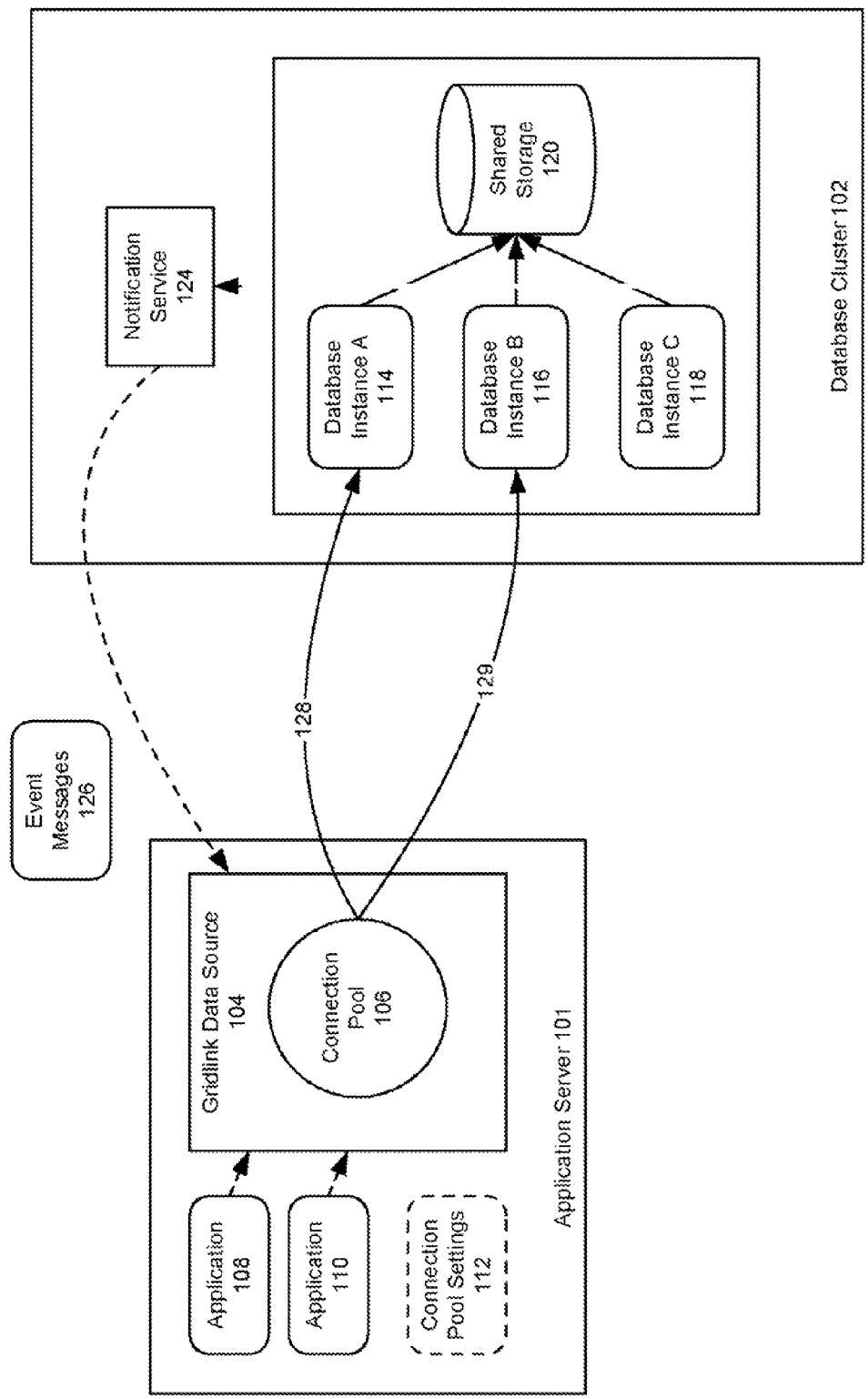
FIG. 1 shows an illustration of a system that includes a data source for connecting an application server with a clustered database, in accordance with an embodiment.

FIG. 1 shows an illustration of a system that includes a data source for connecting an application server with a clustered database, in accordance with an embodiment. As shown in FIG. 1, a data source 104 (in this example referred to as a Grid Link data source, although again other forms of data source may be used) is associated with an application server 101.

The data source simplifies the use of a clustered database 102 with or by the application server, and reduces the configuration and management complexity required to use the clustered database. The data source includes a connection pool 106, which in turn provides a set of heterogeneous connections 128, 129 to the different database instances 114, 116, 118 in the database cluster. In turn, the different database instances can connect to a single, or shared storage 120.

Management of the connections in the connection pool can be based either on static settings 112 configured on the connection pool, such as min/max capacity, or timeouts; and/or on real-time information about the connection pool as described in event messages 126 which are received from the notification service 124 that advises the data sources of state changes within the database cluster.

When an application 108, 110 requests a connection from the data source, a suitable connection can be selected from the connection pool, and supplied to the application based on, e.g. load balancing information the connection pool has received, and/or the current distributions of connections in use from the pool.

In one illustrative example, the above system can be used to provide Oracle database services, wherein the database services can provide a single system image for, e.g. workloads, prioritization of workloads, performance measures for real transactions, and alerts and actions when performance goals are violated. The database services enable database administrators to configure, administer, enable/disable, and measure workloads as a single entity. The database services can be further used to divide workloads into logical groupings, wherein each service represents a workload with common attributes, service-level thresholds, and priorities. An application server can receive load-balancing advisory event messages issued by a clustered database, and adjust database connections to the database nodes or instances accordingly. The system can then perform load-balancing configurations at runtime on the data source, enabling the application server to dispatch database connections based on the load-balancing advisory messages received from the database. Database connections can then be directed to specific database nodes, to satisfy performance goals set by the database administrator.

In another example, the system can support distributed transaction (XA) affinity, to ensure that all database operations performed on a database cluster within the context of a global transaction are directed to the same database instance. Such XA affinity can be established based on a global transaction id, instead of by individual data source, to ensure that connections obtained from different data sources that are configured for the same database cluster are all associated with the same database instance, or that all the data base operations for a global transaction performed on a clustered database are directed to the same database instance. For example, a first connection request for an XA transaction can be load-balanced and assigned with an affinity context. Subsequent connection requests can be routed to the same database instance, using the affinity context of the first connection.

In addition to the above features, the system can employ additional features and functionality, such as the use of a Universal Connection Pool (UCP) library as a connection module to connect an application server to a clustered database. Generally, the UCP library appears as a client-side library from the perspective of the database server, and is logically an extension of a Java Database Connectivity (JDBC) driver used to connect to the database. The use of such a database connection module can support high availability and performance capabilities for a clustered database, in addition to providing generic JDBC connection pooling implementations.

Additional descriptions of various embodiments of a data source system, including some of the above features and functionality, are provided in U.S. patent application Ser. No. 13/168,506, titled "SYSTEM AND METHOD FOR USING A GRIDLINK DATA SOURCE TO CONNECT AN APPLICATION SERVER WITH A CLUSTERED DATABASE", filed Jun. 24, 2011, which application is herein incorporated by reference.

Session Affinity in a Clustered Database Environment

In accordance with an embodiment, the system supports the use of session affinity, for use with web sessions. As referred to herein, session or session-based affinity is a form of temporal affinity, whereby database operations requested by an application are directed to a particular database instance for a period of time when the application may be performing multiple, related updates to a specific data set. Directing such operations to a single database instance can be used to take advantage of increased local cache utilization, and improve overall application performance.

Figure 2:
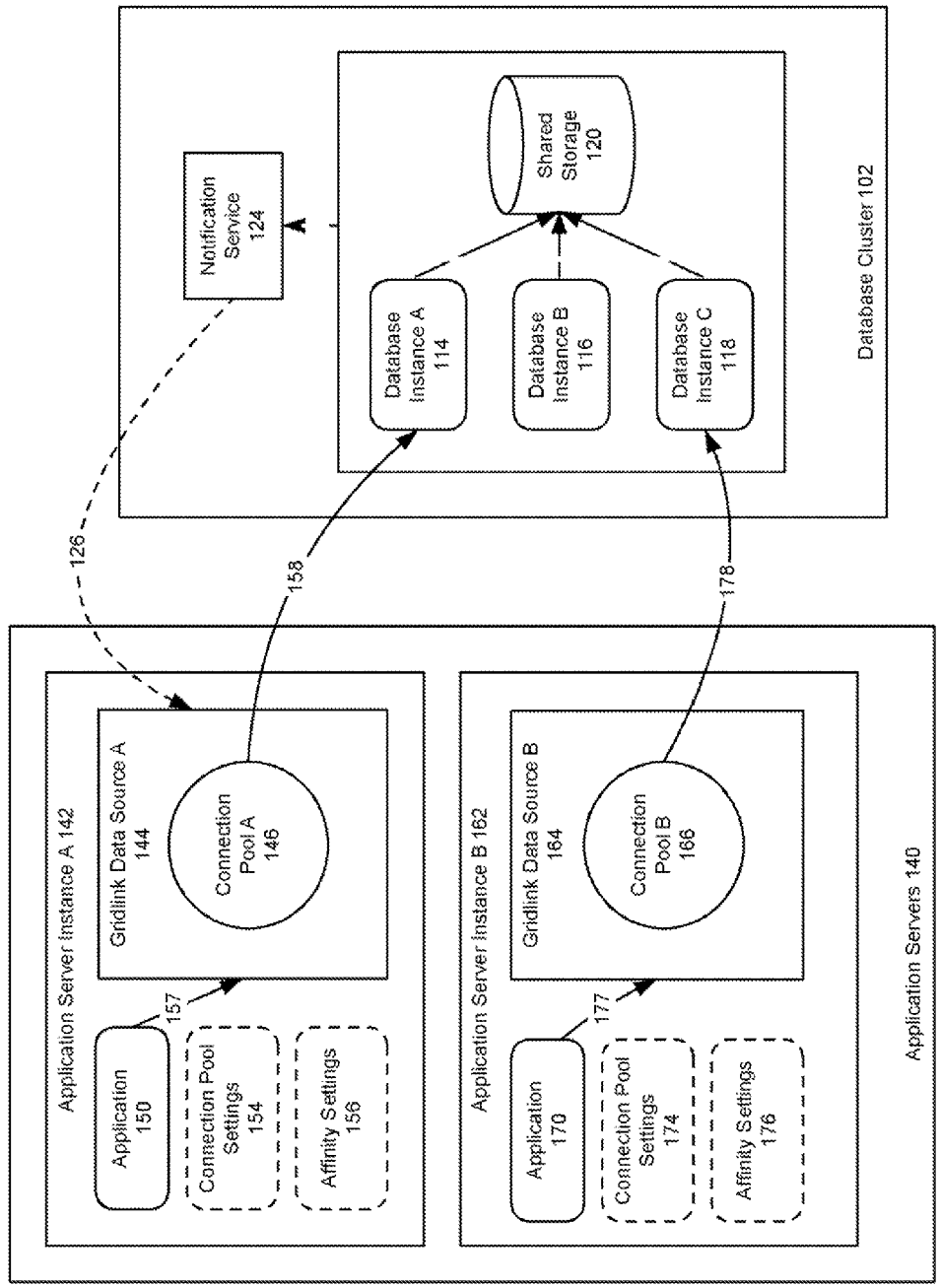
FIG. 2 shows an illustration of multiple application servers and/or data sources being used with a clustered database, utilizing affinity settings, in accordance with an embodiment.

FIG. 2 shows an illustration of an environment in which multiple application servers and/or data sources are being used with a clustered database, utilizing one or more affinity settings, in accordance with an embodiment. As shown in FIG. 2, an application server environment 140 can include one or more application server instances 142, 162. Each application server instance can include one or more data source 144, 164, each with its own connection pool 146, 166, and connection pool settings 154, 174. Together, the data sources provide connections 158, 178 for the applications 150, 170 to the clustered database, and support the consumption of database services in an unrestricted manner in order to provide deeper integration between the applications and the clustered database.

In accordance with an embodiment, each data source can also be associated with one or more affinity settings 156, 176 that can be specified on a per-data source level, or across all or multiple data sources or application servers within the application server environment. Examples of affinity schemes that can be used include XA affinity, and session or session-based affinity.

In the context of a web application, the life of a web session can be a relatively long-lived interaction between the web application and the database, such as the operation by a user of an ecommerce shopping cart feature. When session affinity is used, the system preserves an affinity context for the life of that web session. This provides application performance benefits, since the system will always be going back to the same database instance during that particular web session, and taking advantage of the local cache on that database. Other advantages of using such a session affinity feature include reduced cluster wait time on the database, and in the context of RAC less reliance on synchronizing RAC cluster datasets.

In accordance with an embodiment, affinity information, for use in supporting both session affinity and other affinity schemes, can be pushed out by the notification service within its FAN notifications or events, together with any load advisories etc, that are intended to be replicated across the cluster. In some implementations, the system can extract keys from the data being used by the various applications, and route connections to an appropriate server based on those keys. In some implementations, the system can also leverage UCP at runtime to provide an application callback API that the application can implement, and then at runtime call back the application for it to provide a key that can be used to determine the appropriate routing.

In accordance with an embodiment, an affinity policy can be defined globally across multiple data sources, or individually for each data source. The affinity policy defines which type of affinity (if any) will be used by that data source at runtime. In accordance with an embodiment intended for use with web applications, session affinity is set as the default affinity policy on each data source within the data source environment. Global policy settings take precedence over per-resource policy settings.

At runtime, when an application requests a connection from the data source which has session affinity policy set (specifically, or by default), the system makes a callback to get any available web session context. If such a web session context is available, the system can use that to choose the most appropriate connection; otherwise the system can use, e.g. UCP to choose a connection based on other factors such as runtime load-balancing. Depending on the system's configuration, an affinity context can then be set for that web session, so the next time the application makes a request it has the appropriate session affinity information in its context.

In environments such as WebLogic environments, sessions may not be passed internally. In such environments, the system can instead use functionality such as work context, which propagates around the system with the request. A servlet container can determine from the work context which is persisted with the web session, whether an affinity policy is set, and if so, set the work context as appropriate and retrieve additional information to then choose the most appropriate connection.

Figure 3:
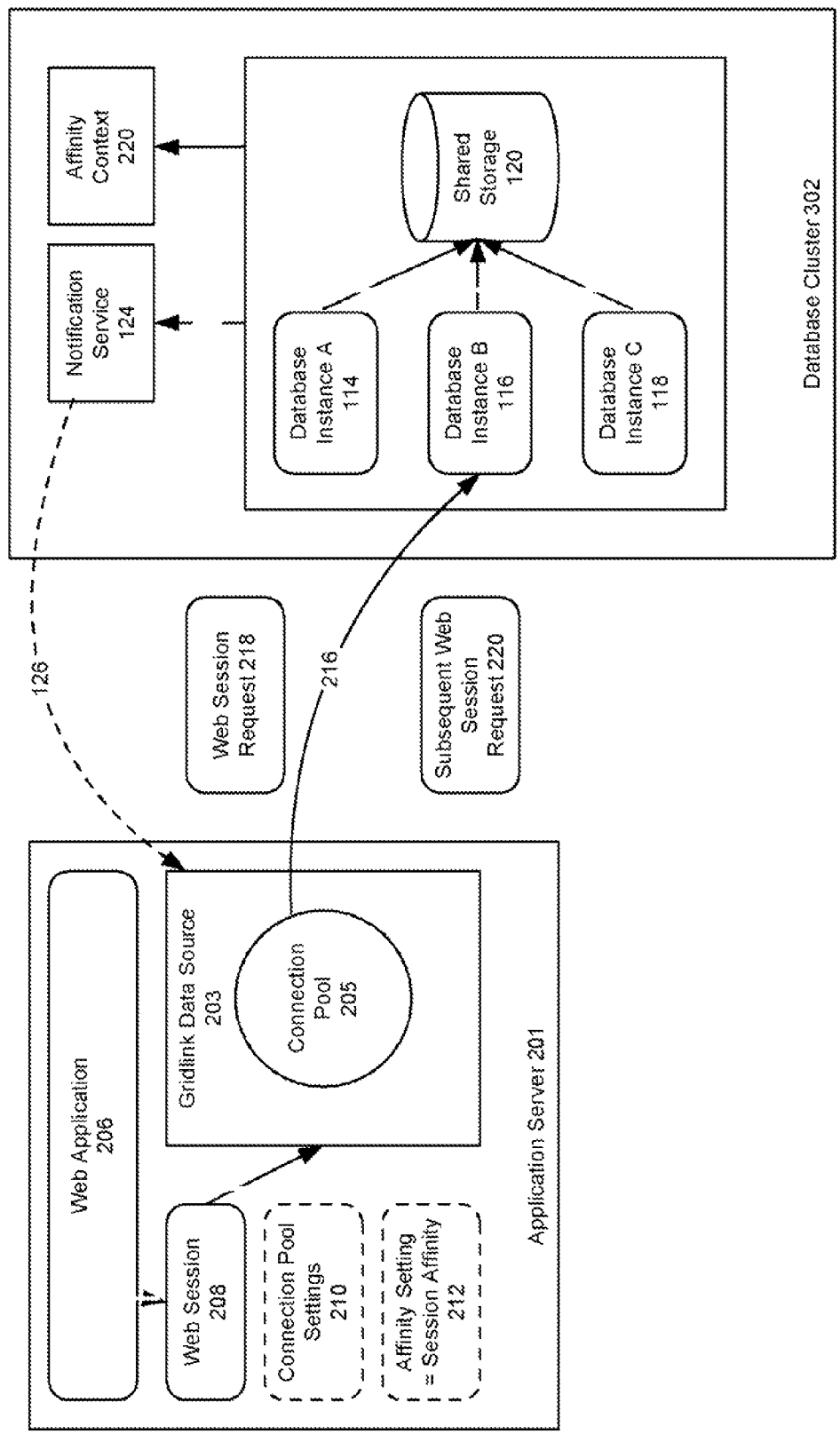
FIG. 3 shows an illustration of a system that includes a web application and supports web session affinity for use with a data source and a clustered database, in accordance with an embodiment.

FIG. 3 shows an illustration of a system that includes a web application, together with a web session, for use with a data source and a clustered database, in accordance with an embodiment. As shown in FIG. 3, each application server instance can include one or more data source 203, each with its own connection pool 205, and connection pool settings 210. When the web application 206 is executed, and a data source connection is invoked as part of a request during the web session 208, if session or session-based affinity is being used 212, a connection is returned to the application 216 for use during the session 218. After the execution of the application request has finished, and before the servlet container has finished its response, the container saves any existing session-based affinity context to the session and/or to a work context map, so that the affinity context is associated with the session for use by subsequent requests 220 during that same web session.

Figure 4:
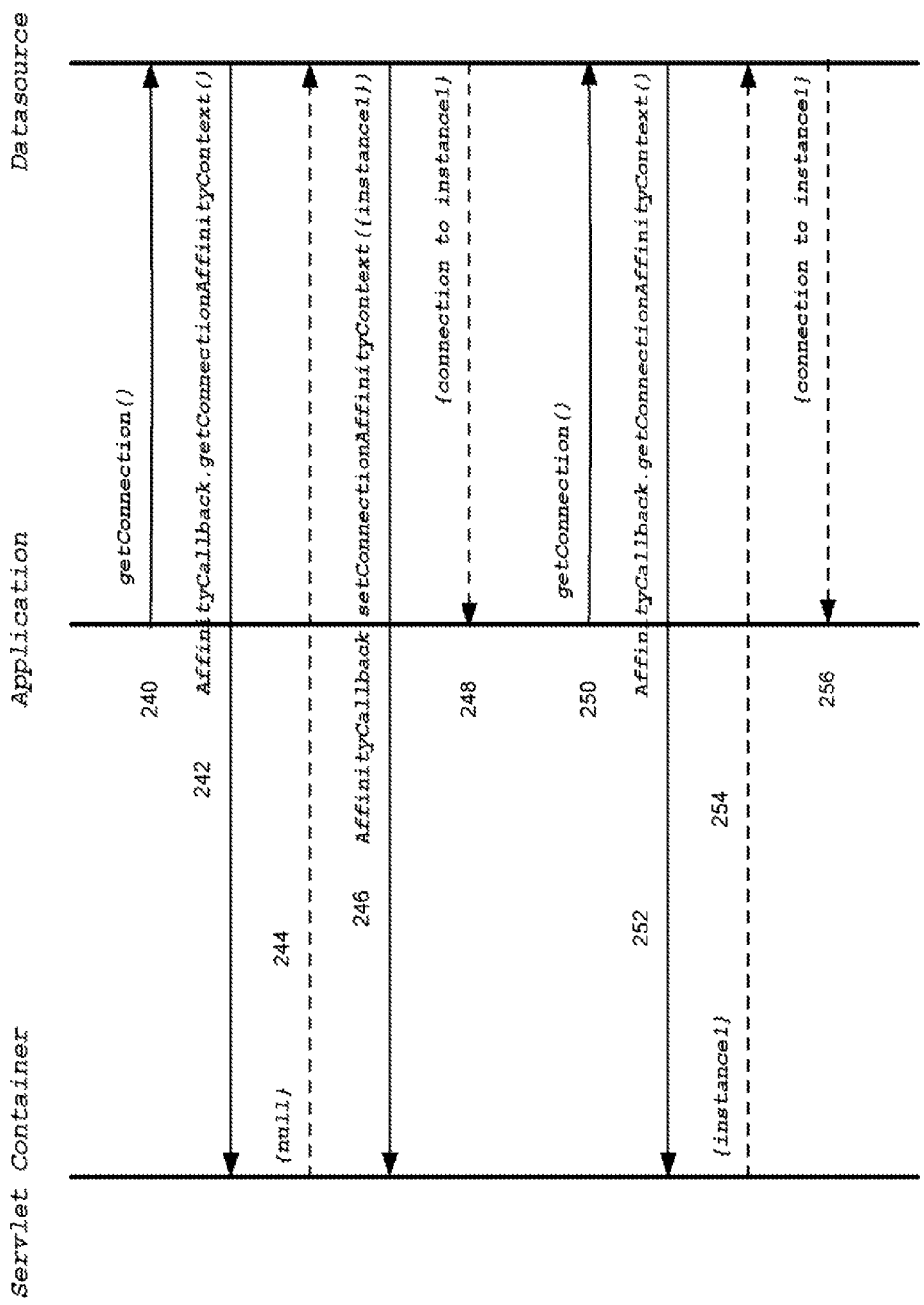
FIG. 4 shows an illustration of an example web session affinity interaction, in accordance with an embodiment.

FIG. 4 shows an illustration of an example web session affinity interaction, in accordance with an embodiment. In accordance with an embodiment, a set of affinity callback interfaces can be defined, e.g. in an oracle.ucp package. In accordance with an embodiment, getConnectionAffinityContext and setConnectionAffinityContext methods are used by the data source and affinity implementation to manage the affinity context association with the application context. For each connection reserve request, the getConnectionAffinityContext method is invoked to determine whether there is already an affinity context associated with the application context (e.g. global transaction or web-session). If not, then a connection is selected, either randomly or according to runtime connection load balancing, and the setConnectionAffinityContext method is called with a context object that identifies the selected database (e.g. RAC) instance. The affinity policy implementation then stores the instance information with the application context for use on the next connection reserve request. As shown in FIG. 4, when a request is received by a servlet container, the servlet container will init or restore work contexts (work contexts are stored in both session internal attribute and a map) before executing application servlet/jsp. At 240, the application is executed and a data source.getConnection( )method is invoked. At 242, SessionAffinityCallback.getAffinityContext( ) is invoked by the data source (in this example a Grid Link data source). At the first time there is no "AffinityContext" stored, so a null is returned 244. At 246, SessionAffinityCallback. setAffinityContext( . . . ) is invoked by the data source, and affinityContext is stored, in this example to the work context map. At 248, a connection is returned to the application. At 250, if getConnection( ) is called again by application, the affinityContext can be fetched from the work context map and then same connection is returned. At 252, after the execution of the application request is finished and before the servlet container has finished the response, the servlet container saves any existing "AffinityContext" to the session and map, so that the affinity context is associated with the session, for use by subsequent requests 254, 256.

In accordance with an embodiment, the affinity context contains the following key values: service name, and database unique name. These are used to check for the correct database and service, returning an instance id when aff=true for that instance. If there is one browser to one context, then the next checkout request should check these attributes to match. For example, if a different service than the previous context pertained to another service, another instance can be used. The calculation at RAC is per-service, not cross-service. If there are many browser windows, each should have its own context information and maintain affinity to its own database and service.

In the example of a WebLogic environment, to support a RAC session affinity feature, the affinity context can be associated to the HTTP session. In this example, the affinity context contains database name, instance name, service name etc. and is used to get a connection from RAC. For requests in same HTTP session (same JSESSIONID in URL or query parameter or cookie header), getConnection( ) is guaranteed to return same connection. It does not matter whether the end-user is using one or multiple browsers and multiple browser windows; session affinity spans multiple data sources for the same database and service.

Figure 5:
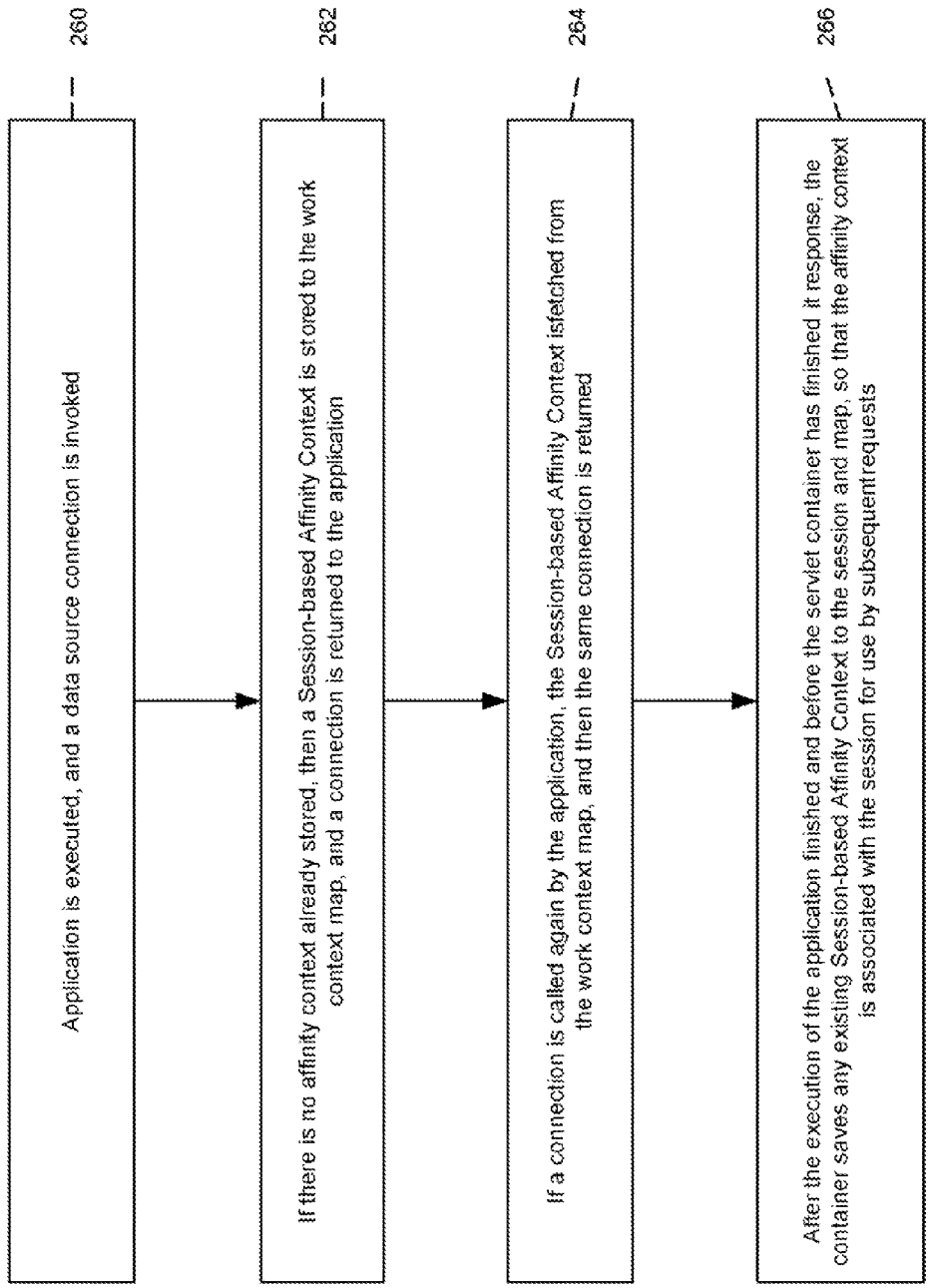
FIG. 5 shows a flowchart of a method for providing web session affinity, in accordance with an embodiment.

FIG. 5 shows a flowchart of a method for providing web session affinity interaction, in accordance with an embodiment. As shown in Figure, at step 260, an application is executed, and a data source connection is invoked. At step 262, if there is no affinity context already stored, then a Session-based Affinity Context is stored to the work context map, and a connection is returned to the application. At step 264, if a connection is called again by the application, the Session-based Affinity Context is fetched from the work context map, and then the same connection is returned. At step 266, after the execution of the application finished and before the servlet container has finished it response, the container saves any existing Session-based Affinity Context to the session and map, so that the affinity context is associated with the session for use by subsequent requests.

In accordance with an embodiment, an API can be defined for use by internal components to implement the session and data affinity policies. The "Session" affinity policy (default) indicates that the affinity context should be associated with and used for the duration of a web application session context. This policy can be used in place of XA affinity and applies to all transactional data source usage during the web session. When a data source with a session affinity policy is accessed outside the context of a web session, the affinity policy will fall back to XA affinity.

In accordance with an embodiment, the WLS Data source subsystem provides methods for managing affinity callback registrations that are intended for use by other internal components that are integrating a particular affinity policy. Callback registrations are global and apply to all GridLink data sources deployed on the server with an affinity policy. Only one callback of each type may be registered at any given time. A particular callback will be invoked at connection reserve time for affinity context processing based on the preferred affinity policy of the data source. Attempting to register a callback implementation with a policy type of Transaction will result in an exception to prevent the possible override of the current XA affinity implementation.

In accordance with an embodiment, affinity processing is only done when a RAC instance is generating the correct events. This is indicated by an "aff" flag for the RAC instance in the load-balancing advisory FAN event being set to true. To make it easier to determine when affinity is enabled for the RAC instance, an AffEnabled property can be added to a runtime MBean.

Java Programming Interface

In accordance with an embodiment, provided below is an example of a Java programming interface for the session affinity feature described above. The example Java programming interface is provided for the purposes of illustration and description, and is not intended to be exhaustive or to limit the invention to the precise forms disclosed.

public interface JDBCOracleParamsBean extends SettableBean
Contains the Oracle database-related parameters of a data source. Configuration parameters for a data source's Oracle-specific behavior can be specified using a Oracle parameters bean.
public java.lang.String getAffinityPolicy( )
Specifies the affinity policy to be used for the data source. Options can include: Transaction, which specifies transaction affinity; Session, which specifies web-session affinity (default); and Data, which specifies data affinity.
public void setAffinityPolicy (String affinityPolicy)
public boolean isAffEnabled( )
Returns the affinity property from the latest load-balancing advisory event.
public interface ConnectionAffinityCallback
Callback interface for Oracle RAC affinity.
public boolean setConnectionAffinityContext (Object affinityContext)
Sets the affinity context. Parameters can include affinityContext—an opaque context object. Returns true if the context object is set successfully, false otherwise.
public java.lang.Object getConnectionAffinityContext( )
Returns the affinity context object.
public void setAffinityPolicy (ConnectionAffinityCallback.AffinityPolicypolicy)
Sets the affinity policy to use for this callback. Parameters can include policy—the affinity policy to use.
public oracle.ucp.ConnectionAffinityCallback.AffinityPolicygetAffinityPolicy( )
Obtains the current affinity policy from this callback. Returns the affinity policy set for this callback.
public boolean isApplicationContextAvailable( )
Checks whether an application context exists for this affinity policy. Returns true if an application context exists for this policy, false otherwise.
public static final class ConnectionAffinityCallback.AffinityPolicy extends Enum
public static oracle.ucp.ConnectionAffinityCallback.AffinityPolicy[ ] values( ) public static oracle.ucp.ConnectionAffinityCallback.AffinityPolicy valueOf (String name)
public interface DataBasedAffinityCallback extends AffinityCallback
Callback interface for Oracle RAC Data Affinity
public boolean setDataKey (Object keyObject)
Sets the data key object used by the application inside this callback implementation. Parameters can include keyObject—data key object. Returns true if data key object is successfully set; false otherwise.
public int getPartitionId( )
Obtains the logical partition identifier for data-based affinity. Returns the logical partition identifier specific to the data key set inside this callback above.
public interface AffinityCallback extends ConnectionAffinityCallback
Callback interface for Oracle RAC affinity. The AffinityCallback interface is the base interface used for registering an affinity provider with the data source service. The interface extends the UCP ConnectionAffinityCallback interface and defines an additional method. An existing UCP affinity implementation may be subclassed to implement the AffinityCallback interface.
public boolean isApplicationContextAvailable( )
Checks whether an application context exists for this affinity policy. Returns true if an application context exists for this policy, false otherwise.
public interface DataAffinityCallback extends AffinityCallback, DataBasedConnectionAffinityCallback
Callback interface for Oracle RAC Data Affinity.
public interface Data sourceService
Internal data source service operations. Components should use this service interface to obtain information and perform global operations on the data source subsystem.
public void registerAffinityCallback (AffinityCallback callback)
Registers a global affinity callback that will be invoked by all data sources that are configured for affinity. Parameters can include callback—the callback instance to register.

public boolean unregisterAffinityCallback (AffinityCallback callback)

Unregisters the specified affinity callback. Parameters can include callback—the callback instance to unregister. Returns true if the callback was registered previously, false otherwise.

public void registerDataAffinityCallback (DataBasedConnectionAffinityCallback callback)

Registers a global data affinity callback that will be invoked by all data sources that are configured for affinity. Parameters can include callback—the callback instance to register.

public boolean isAffinityPolicyDeployed (ConnectionAffinityCallback.AffinityPolicy policy)

Returns whether a data source is deployed on the current server with the specified affinity policy.

Parameters can include policy—the affinity policy of a deployed data source. Returns true if a data source is deployed with the specified policy, false otherwise.

public void registerAffinityPolicyListener (AffinityPolicyListener listener, ConnectionAffinityCallback.AffinityPolicy policy)

Register an affinity policy listener callback for the specified affinity policy. The callback will be invoked whenever there is a change in the deployment status of the specified affinity policy. The callback will be invoked immediately after first registration. Parameters can include listener—the callback implementation to register; and policy—the affinity policy to listen for.

public boolean unregisterAffinityPolicyListener (AffinityPolicyListener listener)

Unregister the specified policy listener callback. Parameters can include listener—the listener callback to unregister. Returns true if the specified callback was registered, false otherwise.

public interface AffinityPolicyListener

Implementations can be registered with Data sourceService to receive notifications when a data source with a specific affinity policy is deployed or undeployed.

public void affinityPolicyNotification (ConnectionAffinityCallback.AffinityPolicy policy, boolean deployed)

Invoked there is a change in the deployment status of a particular affinity policy. Parameters can include policy—the affinity policy for which the notification applies; and deployed—whether a data source is deployed with the affinity policy.

Improved Application Connectivity in a Clustered Database Environment

In accordance with an embodiment, the system includes a driver (e.g. JDBC) replay feature, which delivers a general purpose, application-independent infrastructure that enables recovery of work from an application perspective and masks many system, communication, and hardware failures, and hangs. The semantics help assure that end-user transactions can be executed on time and at-most-once. The net result is that the only time an end-user should see an interruption in service is when the outage is such that there is no point in continuing.

Figure 6:
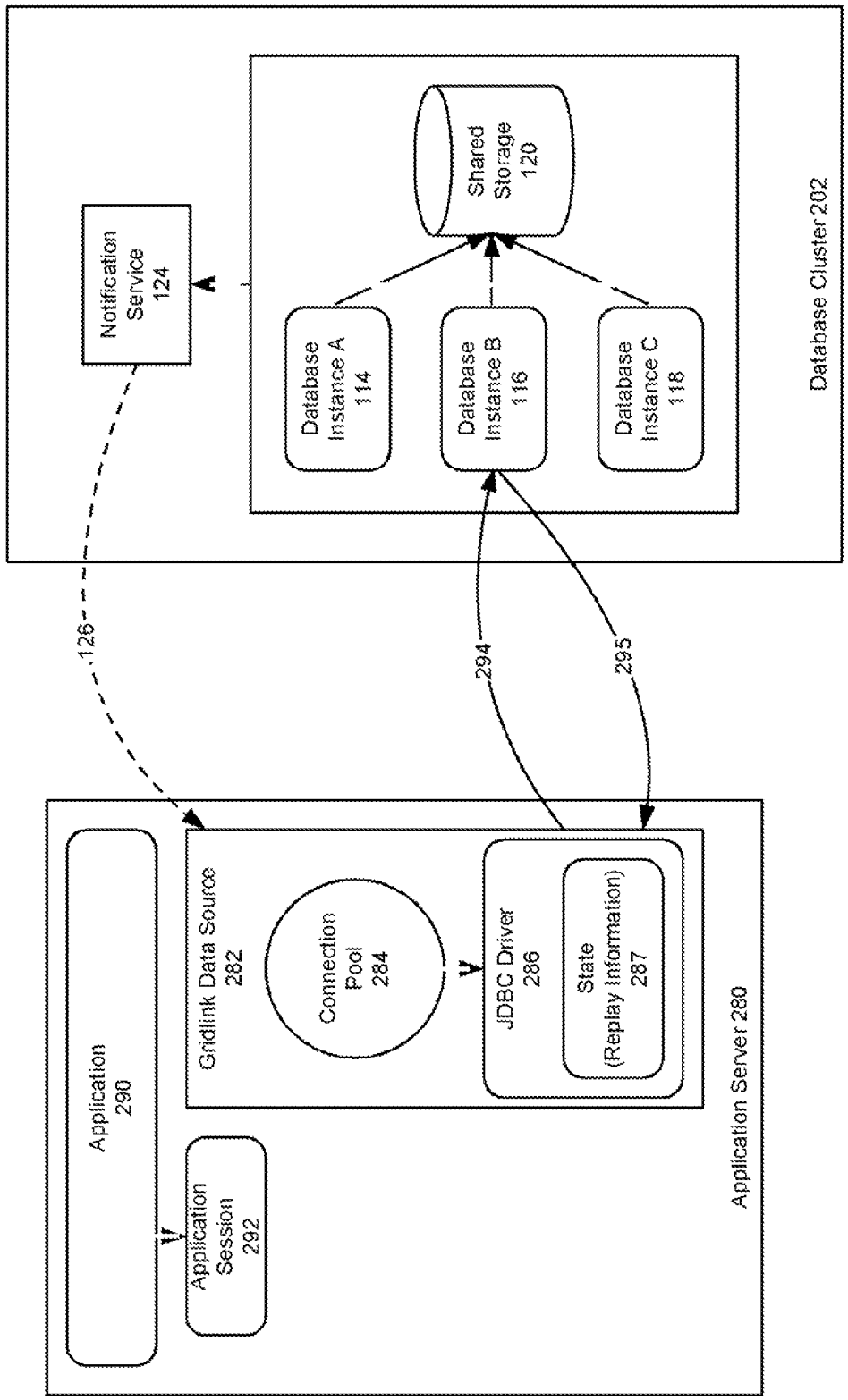
FIG. 6 shows an illustration of a system that includes a data source for connecting an application server with a clustered database, together with a driver replay feature, in accordance with an embodiment.

FIG. 6 shows an illustration of a system that includes a data source for connecting an application server with a clustered database, together with a driver replay feature, in accordance with an embodiment. As shown in FIG. 6, a data source 282 (in this example referred to as a GridLink data source, although again other forms of data source may be used provides a single data source associated with an application server 280, for use with a clustered database 202. The data source again includes a connection pool 284, which in turn provides a set of heterogeneous connections to different database instances 114, 116, and 118 in the database cluster; and the different database instances can connect to a single, or shared storage 120.

In accordance with an embodiment, the system further comprises a JDBC driver 286 which is used by the various connections to access the database instances. When an application 290 requests a connection from the data source, a suitable connection can be selected from the connection pool and supplied to the application based on, e.g. load balancing information the connection pool has received by way of FAN notifications, and/or the current distributions of connections in use from the pool. The application session 292 can then issues requests 294 to the database via the connection pool and the JDBC driver, and receive corresponding responses or results 295, which are then returned to the application.

In accordance with an embodiment, during the operation of an application using a web session, if the connection goes down or fails, the JDBC driver records the state 287 of what information or data was previously queried by the application from the database, and replays the session to that point to process the query against the database, so that the application does not itself see any error or exception.

In accordance with an embodiment, the feature is particularly useful for non-transactional read-only or select-only cases, although in accordance with other embodiments similar techniques could be used for transactional cases and although not intended for use with transactions but can be extended to support those cases. Depending on the complexity of the use-case (e.g. read-only versus transactional, and simple versus complex session requests), there may be a performance and memory hit in using the JDBC driver replay, so there is a tradeoff in terms of slightly lower performance versus improved application continuity and fewer application interruptions. (As described above, in accordance with an embodiment, the system implements a Java-specific application server feature that works with a JDBC driver, such as the Oracle JDBC driver. In accordance wither other embodiments, other drivers can be used, e.g., in the context of a Tuxedo system an OCI Oracle driver.)

Figure 7:
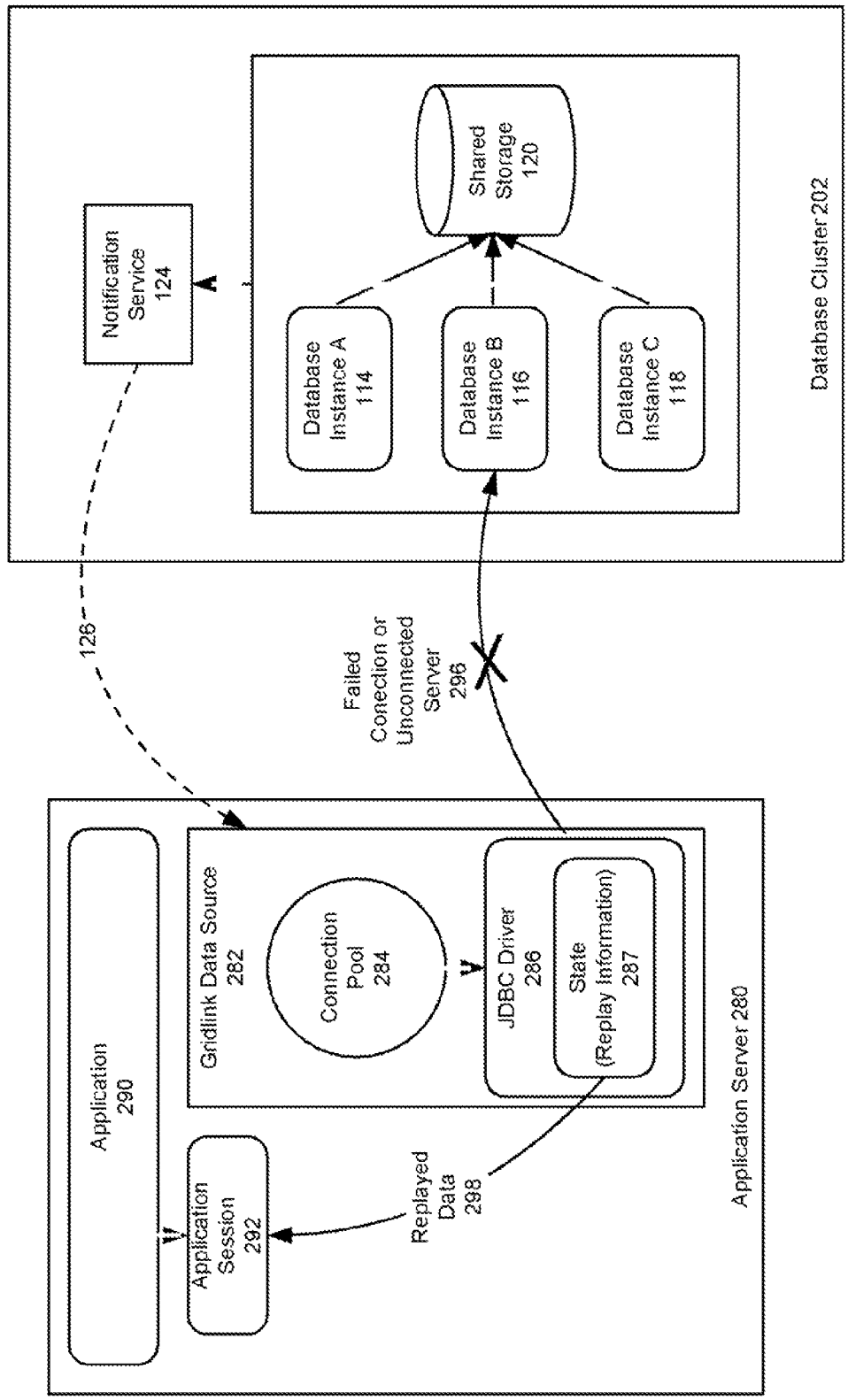
FIG. 7 shows another illustration of a system that includes a data source for connecting an application server with a clustered database, together with a driver replay feature used to replay select data, in accordance with an embodiment.

FIG. 7 shows another illustration of a system that includes a data source for connecting an application server with a clustered database, together with a driver replay feature used to replay select data, in accordance with an embodiment. As shown in FIG. 7, an application makes a request to select data from a database instance of the clustered database via the connection pool and JDBC driver, and the JDBC driver records the results of read-only or select data from the database instance. If the system subsequently determines the application has lost its connection 296 to the database instance, the data stored in the JDBC driver in response to previously-received application requests is used by the JDBC driver to replay 298 the application requests and responses up to that point of the session.

Figure 8:
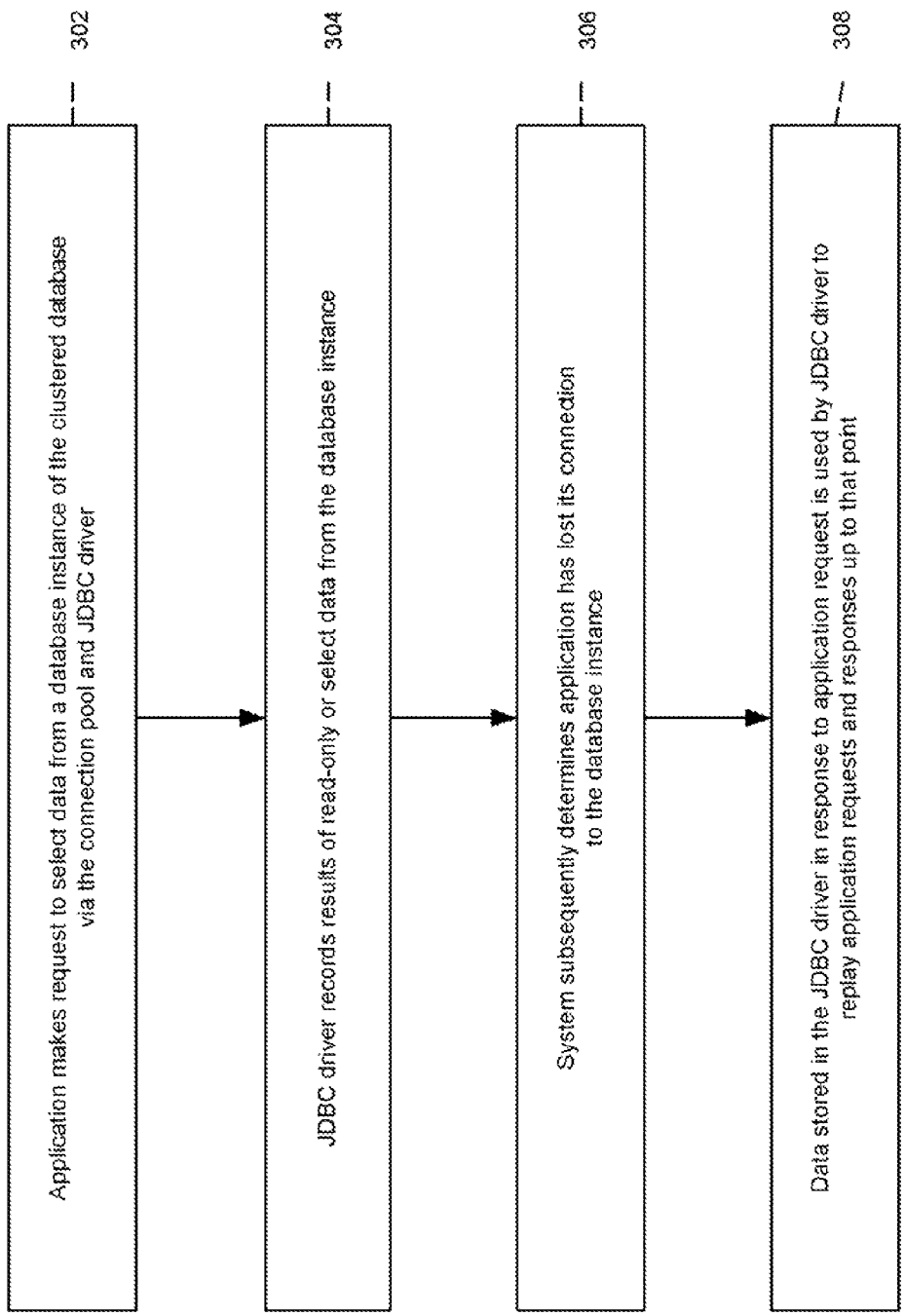
FIG. 8 shows a flowchart of a method for providing a driver replay feature, in accordance with an embodiment.

FIG. 8 shows a flowchart of a method for providing a driver replay feature, in accordance with an embodiment. As shown in FIG. 8, at step 302, an application makes a request to select data from a database instance of the clustered database via the connection pool and JDBC driver. At step 304, the JDBC driver records the results of read-only or select data from the database instance, within the driver memory space itself. At step 306, the system subsequently determines that the application has lost its connection to the database instance. At step 308, the data previously stored in the JDBC driver in response to application request is used by the JDBC driver to replay application requests and responses up to that point of the session.

In accordance with an embodiment, the above functionality can be largely implemented in, e.g. an Oracle database driver and server, or other form of JDBC or database driver.

Application servers, such as WebLogic Server, can then expose interfaces to help control the driver replay feature and participate in demarcating the work that needs to be recovered.

In accordance with an embodiment, the normal Oracle driver/data source classes can be replaced with a "oracle.jdbc.replay.OracleData sourceImpl" class. The administrative console will indicate that, if this driver is selected, XA is ignored. An end-user or administrator can use the console, or a text editor or programmatically (e.g., WLST) to specify the correct driver and provide further configuration.

Although the embodiments described above illustrate the use of the driver replay feature with read-only scenarios, in accordance with other embodiments the driver replay feature can also be used with data update scenarios.

To create a connection initialization callback, an application can implement the oracle.ucp.jdbc.ConnectionInitializationCallback interface. One callback is created per connection pool. The interface provides one method as shown below:

void initialize (java.sql.Connection connection) throws SQLException

If is ignored if a labeling callback is registered for the connection pool. Otherwise, it is executed at every connection check out from the pool and at each successful reconnect following a recoverable error at replay. Using the same callback at run time and at replay ensures that exactly the same initialization that was used when the original session was established, is re-established at runtime. It is the implementer of the callback's responsibility to ensure that this is the case. If the callback invocation fails, replay is disabled on that connection. The following example demonstrates a simple initialization callback implementation.

```
import oracle.ucp.jdbc.ConnectionInitializationCallback ;
class MyConnectionInitializationCallback implements
ConnectionInitializationCallback {
    public MyConnectionInitializationCallback( ) {
    }
    public void initialize(Java.sql.Connection connection) throws
SQLException {
        // Re-set the state for the connection, if necessary
    }
}
```

A WLS data source provides the registerConnectionInitializationCallback (ConnectionInitializationCallback callback) method for registering initialization callbacks. Only one callback may be registered on a connection pool. The following example demonstrates registering an initialization callback that is implemented in the MyConnectionInitializationCallback class:

```
import weblogic.jdbc.extensions.WLDataSource;
MyConnectionInitializationCallback callback = new
MyConnectionInitializationCallback( );
((WLDataSource)ds).registerConnectionInitializationCallback( callback );
```

The callback can also be configured via the schema via a new connection-initialization-callback element in the Oracle parameters. A WLS data source provides the removeConnectionInitializationCallback( )method for removing a Initialization callback. The following example demonstrates removing an initialization callback.

```
import weblogic.jdbc.extensions.WLDataSource;
((WLDataSource)ds).unregisterConnectionInitializationCallback(callback
);
```

In accordance with an embodiment, WebLogic Server can implement and register oracle.jdbc.replay.internal.ConnectionInitializationCallback. The initialize( )method will invoke the Connection LabelingCallback implementation if registered. Otherwise, the initialize( )method will invoke the ConnectionInitializationCallback implementation if registered. The initialization callback should also be invoked when a connection is given out by the pool if a labeling callback is not registered. WLS will call beginRequest and endRequest on the connection to bracket work on the connection. beginRequest returns an error if called with an open transaction or if there has been no endRequest( )since the last beginRequest or returning the connection to the pool. endRequest is a declaration that the connection could be replaced by a new connection.

Receiving this marker allows the replay driver to take the following actions with respect to recording for replay: Purge transaction history and accumulated purge-on-close (lazy) cursors. This only purges recorded Call History. It does not involve altering a connection's state by re-executing any JDBC method, SQL, or PL/SQL.; Clear the saved reason for disabling replay (error code), if replay is disabled.; Disable replay. Replay will be enabled at the next beginRequest call.; Return an error if called with an open transaction (determined by the transaction bit).; An error is not returned on repeated end Request calls, as these may be result of legitimate errors and sessions closing. Replay can be disabled on a per-connection basis as follows.

```
if (connection instanceof oracle.jdbc.replay.ReplayableConnection) {
    ((oracle.jdbc.replay.ReplayableConnection)connection).disableReplay( );
}
```

Java Programming Interface

In accordance with an embodiment, provided below is an example of a Java programming interface for the JDBC driver replay feature described above. The example Java programming interface is provided for the purposes of illustration and description, and is not intended to be exhaustive or to limit the invention to the precise forms disclosed.

<element name="connection-initialization-callback" type="string" nillable="true" minOccurs="0">

The name of the connection initialization callback. This is automatically passed to registerConnectionInitializationCallback when the data source is created.

public interface ConnectionInitializationCallback
API that is invoked at every connection check out from the pool, as well as at each successful reconnect following a recoverable error at replay.
void initialize (java.sql.Connection connection) throws SQLException
Invoked at every connection check out from the pool, as well as at each successful reconnect following a recoverable error at replay. Using the same callback at run time and at replay ensures that exactly the same initialization that was used when the original session was established, is re-established at runtime. It is the implementer of the callback's responsibility to ensure that this is the case. If the callback invocation fails, replay is disabled on that connection.
public String getConnectionInitializationCallback( );
public void setConnectionInitializationCallback( );

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art. In accordance with some embodiments, systems and components developed in accordance with the present invention can include, or can be implemented or provided as, computer hardware, software, firmware, or any combinations thereof.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting affinity in a data source and clustered database environment, comprising:
   a computer, including a computer readable medium and one or more microprocessors;
   a clustered database system, and a notification service associated with a plurality of database instances in the clustered database system, wherein the notification service broadcasts notifications that describe state changes in the clustered database;
   an application server environment on the computer, including one or more application server instances therein, wherein each said application server instance is associated with one or more data sources and one or more connection pools, wherein each said data source is associated with one or more affinity policies, each said affinity policy defining one of a session affinity and a distributed transaction (XA) affinity for that data source, wherein the data sources and connection pools are used to manage connections to the plurality of database instances in the clustered database based on the state changes in the clustered database;
   wherein the session affinity is set as a default affinity policy for each said data source, and wherein the session affinity switches to the XA affinity when the each said data source is accessed outside a context of a session;
   wherein when the session affinity is triggered for the each said data source, database operations requested by an application during a session are routed to a same said database instance;
   wherein the routing to the same said database instance is performed by
      storing routing information to an affinity context, and
      associating the affinity context with the session using a work context object of the application,
      wherein the work context object propagates around the system and is accessible to each of the application requests for the database operations.

2. The system of claim 1, wherein the affinity policy is defined globally across multiple data sources, or individually for each of said multiple data sources.

3. The system of claim 2, wherein at runtime, when the application requests a connection from one of the data sources which has a session affinity policy set, the system makes a callback to get any available context associated with the session, wherein the system then uses the affinity context associated with the session to choose an appropriate connection.

4. The system of claim 3, wherein a servlet container determines from the work context object that the affinity policy is set and retrieves additional information for choosing the appropriate connection.

5. A method for supporting session affinity in a data source and clustered database environment, comprising the steps of:
   providing access to a clustered database system, and a notification service associated with a plurality of database instances in the clustered database system, wherein the notification service broadcasts notifications that describe state changes in the clustered database;
   providing an application server environment, including one or more application server instances therein, wherein each said application server instance is associated with one or more data sources and one or more connection pools, wherein each said data source is associated with one or more affinity policies, each said affinity policy defining one of a session affinity and a distributed transaction (XA) affinity for that data source, wherein the data sources and connection pools are used to manage connections to the plurality of database instances in the clustered database based on the state changes in the clustered database;
   wherein the session affinity is set as a default affinity policy for each said data source, and wherein the session affinity switches to the XA affinity when the each said data source is accessed outside a context of a session;
   wherein when the session affinity is triggered for the each said data source, database operations requested by an application during a session are directed to a said same database instances;
   wherein the routing to the same said database instance is performed by
      storing routing information to an affinity context, and associating the affinity context with the session using a work context object of the application, wherein the work context object propagates around the system and is accessible to each of the application requests for the database operations.

6. The method of claim 5, wherein the affinity policy is defined globally across multipe data sources, or individually for each of said multiple data sources.

7. The method of claim 6, wherein at runtime, when the application requests a connection from one of the data sources which has a session affinity policy set, the system makes a callback to get any available context associated with the session, wherein the system then uses the affinity context associated with the session to choose an appropriate connection.

8. The method of claim 7, wherein a servlet container determines from the work context object that the affinity policy is set and retrieves additional information for choosing the appropriate connection.

9. A non-transitory computer readable medium, including instructions stored thereon which when read and executed by one or more computers cause the one or more computers to perform the steps comprising:

providing access to a clustered database system, and a notification service associated with a plurality of database instances in the clustered database system, wherein the notification service broadcasts notifications that describe state changes in the clustered database;

providing an application server environment, including one or more application server instances therein, wherein each said application server instance is associated with one or more data sources and one or more connection pools, wherein each said data source is associated with one or more affinity policies, each said affinity policy defining one of a session affinity and a distributed transaction (XA) affinity for that data source, wherein the data sources and connection pools are used to manage connections to the plurality of database instances in the clustered database based on the state changes in the clustered database;

wherein the session affinity is set as a default affinity policy for each said data source, and wherein the session affinity switches to the XA affinity when the each said data source is accessed outside a context of a session;

wherein when the session affinity is triggered for the each said data source, database operations requested by an application during a session are directed to a said same database instance;

wherein the routing to the same said database instance is performed by
storing routing information to an affinity context, and
associating the affinity context with the session using a work context object of the application,
wherein the work context object propagates around the system and is accessible to each of the application requests for the database operations.

10. The non-transitory computer readable medium of claim 9, wherein the affinity policy is defined globally across multiple database source, or individually for each of said multiple data sources.

11. The non-transitory computer readable medium of claim 10, wherein at runtime, when the application requests a connection from one of the data sources which has a session affinity policy set, the system makes a callback to get any available context associated with the session, wherein the system then uses the affinity context associated with the session to choose an appropriate connection.

12. The non-transitory computer readable medium of claim 11, wherein a servlet container determines from the work context object that the affinity policy is set and retrieves additional information for choosing the appropriate connection.

13. The system of claim 1, wherein the notification service sends affinity information to be replicated across the clustered database.

14. The system of claim 1, wherein keys are extracted from data being used by the application to route client connections to an appropriate server.

15. The system of claim 2, wherein the affinity policy defined globally takes precedence over the affinity policy defined individually.

16. The method of claim 5, wherein the notification service sends affinity information to be replicated across the clustered database.

17. The method of claim 5, further comprising extracting keys from data being used by the application to route client connections to an appropriate server.

18. The method of claim 6, wherein the affinity policy defined globally takes precedence over the affinity policy defined individually.

19. The non-transitory computer readable medium of claim 9, wherein the notification service sends affinity information to be replicated across the clustered database.

20. The non-transitory computer readable medium of claim 9, wherein the notification service sends affinity information to be replicated across the clustered database.

* * * * *

UNITED STATES PATENT AND TRADEMARK OFFICE
CERTIFICATE OF CORRECTION

PATENT NO.         : 8,635,185 B2
APPLICATION NO.    : 13/398538
DATED              : January 21, 2014
INVENTOR(S)        : Somogyi et al.

It is certified that error appears in the above-identified patent and that said Letters Patent is hereby corrected as shown below:

In the Drawings:

On Sheet 5 of 8, in figure 5, under Reference Numeral 264, line 1, delete "isfetched" and insert -- is fetched --, therefor.

On Sheet 7 of 8, in figure 7, under Reference Numeral 296, line 2, delete "Conection" and insert -- Connection --, therefor.

In the Specification:

In column 2, line 3, delete "Grid Link" and insert -- GridLink --, therefor.

In column 3, line 31-32, delete "Grid Link" and insert -- GridLink --, therefor.

In column 6, line 34-35, delete "SessionAffinityCallback.getAffnityContext()" and insert -- SessionAffinityCallback.getAffinityContext() --, therefor.

In column 6, line 36, delete "Grid Link" and insert -- GridLink --, therefor.

In column 6, line 38, delete "SessionAffnityCallback." and insert -- SessionAffinityCallback. --, therefor.

In column 11, line 7, delete "sourceImpl'"" and insert -- sourceimpl" --, therefor.

In column 12, line 3, delete "parameters.A" and insert -- parameters. A --, therefor.

In column 12, line 26-27, delete "begin Request" and insert -- beginRequest --, therefor.

Signed and Sealed this
Twenty-fourth Day of June, 2014

Michelle K. Lee
*Deputy Director of the United States Patent and Trademark Office*

CERTIFICATE OF CORRECTION (continued)
U.S. Pat. No. 8,635,185 B2

In column 12, line 45, delete "end Request" and insert -- endRequest --, therefor.

In column 12, line 49, delete "instanceof" and insert -- instance of --, therefor.

In the Claims:

In column 14, line 64, in Claim 5, delete "instances;" and insert -- instance; --, therefor.

In column 15, line 7, in Claim 6, delete "multipe" and insert -- multiple --, therefor.